United States Patent [19]

Li

[11] Patent Number: 4,704,653
[45] Date of Patent: Nov. 3, 1987

[54] TRANSFORMER DIFFERENTIAL RELAY WITH SPEED-UP APPARATUS

[75] Inventor: Hung J. Li, Coral Springs, Fla.

[73] Assignee: Westinghouse Electric Corp., Pittsburgh, Pa.

[21] Appl. No.: 807,136

[22] Filed: Dec. 10, 1985

[51] Int. Cl.[4] .............................................. H02H 7/04
[52] U.S. Cl. ...................................... 361/36; 361/63; 361/95
[58] Field of Search ..................... 361/35, 36, 78, 86, 361/87, 89, 91, 93, 95, 79, 80, 63

[56] References Cited

U.S. PATENT DOCUMENTS

| | | | |
|---|---|---|---|
| 3,983,455 | 9/1976 | Hinman, Jr. | 361/68 X |
| 4,091,433 | 5/1978 | Wilkinson | 361/86 X |
| 4,204,237 | 5/1980 | Zocholl | 361/36 |
| 4,402,028 | 8/1983 | Udren | 361/36 |
| 4,477,854 | 10/1984 | Usui et al. | 361/36 |
| 4,502,086 | 2/1985 | Ebisaka | 361/36 X |
| 4,590,533 | 5/1986 | Murata | 361/35 X |

Primary Examiner—A. D. Pellinen
Assistant Examiner—Derek S. Jennings
Attorney, Agent, or Firm—G. H. Telfer

[57] ABSTRACT

A transformer differential relay which includes apparatus for speeding up the detection of a power transformer internal fault condition to initiate breaker action which interrupts current through the transformer is disclosed. Presently, conventional transformer differential relays include a unit for each phase of the power transformer for detecting a potential internal fault in a respective transformer phase winding and for generating a signal to operate a set of breakers. This breaker operation is inhibited for current inrush conditions of the transformer. However, a processing time is associated with the detection of such a current inrush condition. Accordingly, the breaker operating signal must be delayed for at least this processing time in order for the inhibition to be effectuated. For the case in which there is no current inrush condition, the breakers remain delayed in operation from the inception of a true internal fault. The aforementioned speed-up apparatus circumvents this time delay in breaker operation and renders breaker initiation for detected internal faults with response times on the order of 3-5 milliseconds. In addition, the speed-up apparatus is inhibited from responding to potential internal fault conditions which may arise from initial inrush or recovery inrush current conditions or an external fault condition with severe current transformer saturation.

11 Claims, 3 Drawing Figures

TRANSFORMER DIFFERENTIAL RELAY WITH SPEED-UP APPARATUS

BACKGROUND OF THE INVENTION

The present invention relates to transformer differential relays in general, and more particularly, to a transformer differential relay which includes apparatus for speeding up the detection of a power transformer internal fault condition to initiate breaker action which interrupts current through the transformer.

Present transformer differential relays utilize a percentage type differential measuring unit for detecting potential internal fault conditions in a power transformer of a power system and for initiating breaker action to isolate the transformer from its current paths in the power system. Under certain situations, like when the transformer is initially energized or when a collapsed voltage is recovered following clearing of a certain external fault, the resulting magnetizing initial or recovery inrush current conditions appear to the differential relay as an internal fault condition and may produce false breaker operation. Conventional transformer differential relays include a second measuring unit to detect an inrush current condition by measuring the content of a selected harmonic of the power system frequency and to block or restrain breaker operation by the differential unit upon such detection. This discrimination between inrush current and internal fault current conditions is possible because the present power transformer characteristics cause severe distortion of the inrush current waveform rendering it rich in second harmonic content which may be on the order of 15% of the fundamental signal content. The secondary measuring units in the differential relays are commonly referred to as harmonic restraint units.

In order to detect an inrush current condition, the harmonic restraint unit must collect enough of the differential-current signal to determine the ratio of the line frequency component to the second harmonic component of the waveform. Generally, this requires on the order of a cycle of the powerline waveform or more of signal data regardless of the method used to find the inrush current ratio. Accordingly, the response time of the differential relay is delayed by the processing time of determining whether or not an inrush current condition exists before it may issue breaker operation.

If these inrush current conditions are ignored, it is entirely feasible to implement an electronic differential relay which can trip in 3-5 ms for internal faults basing the differential protection solely on the instantaneous vector sum of measured current signals representive of the currents of a common power system phase of the transformer; no processing of the measured current signal waveforms is needed to detect an inrush condition, thus no delay is incurred. However, such a relay will also cause unwanted breaker action for false detection of internal faults under inrush current conditions.

One approach to speeding up the operation of the differential relay without incurring false internal fault breaker operation is disclosed in the U.S. Pat. No. 4,402,028, issued Aug. 30, 1983 to Eric A. Udren, entitled "Protective Relay Methods and Apparatus". In the Udren relay, harmonic restraint is preempted by voltage supervision, allowing the differential current unit thereof to make trip decisions within 3-5 milliseconds after the internal transformer fault is induced. The Udren relay operates using the principal that the voltage in the transformer zone increases rapidly upon inrush current conditions. The harmonic restraint function is invoked when the rate of change of voltage increase in the transformer zone exceeds a predetermined rate value. Under the conditions of a decreasing or steady voltage in the transformer zone, the harmonic restraint operation is preempted by the voltage supervision allowing the aforementioned response time to initiate breaker operation to an induced internal transformer fault. The primary drawback of the Udren relay is that, for the most part, power system transformer relays do not have voltage measuring devices available, thus the application of the Udren relay is limited to where voltage measurement and instrumentation is available or where potential transformers and wiring connections are provided at the transformer.

On the other hand, current measuring devices are provided at the transformer and include wiring connections to the site of the protective relays therefor. Thus, it would be completely desirable to have a current supervision approach for speeding up the response time of a transformer differential relay while inhibiting breaker operation due to unwanted false internal fault conditions such as initial and recovery inrush current conditions, for example. A transformer differential relay with current supervision for response speed-up purposes can utilize the current measuring devices in place about the transformer to be protected without the necessity of adding additional measuring devices and the wiring connections therefor.

SUMMARY OF THE INVENTION

A transformer having a plurality of windings of at least one phase is disposed in a three-phase power system network. Coupled to the transformer is a differential relay for protecting against internal transformer faults. Each winding of the transformer has associated therewith a current measuring device which generates a signal representative of the current through its corresponding winding. The differential relay includes a circuit for receiving the current signals from the current measuring devices of the at least one phase of the transformer. The relay further includes circuits for deriving a highest restraint signal and an operating signal from the one phase current signals. Another circuit which is governed by the operating and highest restraint signals is operative to detect a potential internal fault condition in the one phase of the transformer and to generate a first signal representative of such detection. Still another circuit which is governed by the operating signal detects a current inrush condition in the one phase of the transformer and generates a second signal representative of such detection. This detection process takes a predetermined time interval for completion. The first signal is delayed for a time interval corresponding to the processing time interval of the current inrush detection. A breaker means is operated by the delayed first signal to interrupt current through the transformer unless inhibited by the second signal.

An additional circuit of the relay is governed by the highest restraint, operating and first signals to detect a transformer internal fault condition and to generate in response to the detection, without substantially delay, another signal for operating the breaker means, whereby this additional circuit is operative to circumvent the delayed operation of the breaker by the first signal and speed up the generation of a signal for operating the breaker under transformer internal fault conditions. This additional circuit further includes a portion which is governed by the highest restraint signal and the first signal to detect a recovery inrush current condition in the one phase of the transformer and to generate a signal indicative of the detection for inhibiting the generation of the undelayed breaker operating signal.

DESCRIPTION OF THE PREFERRED EMBODIMENT

Figure 1:
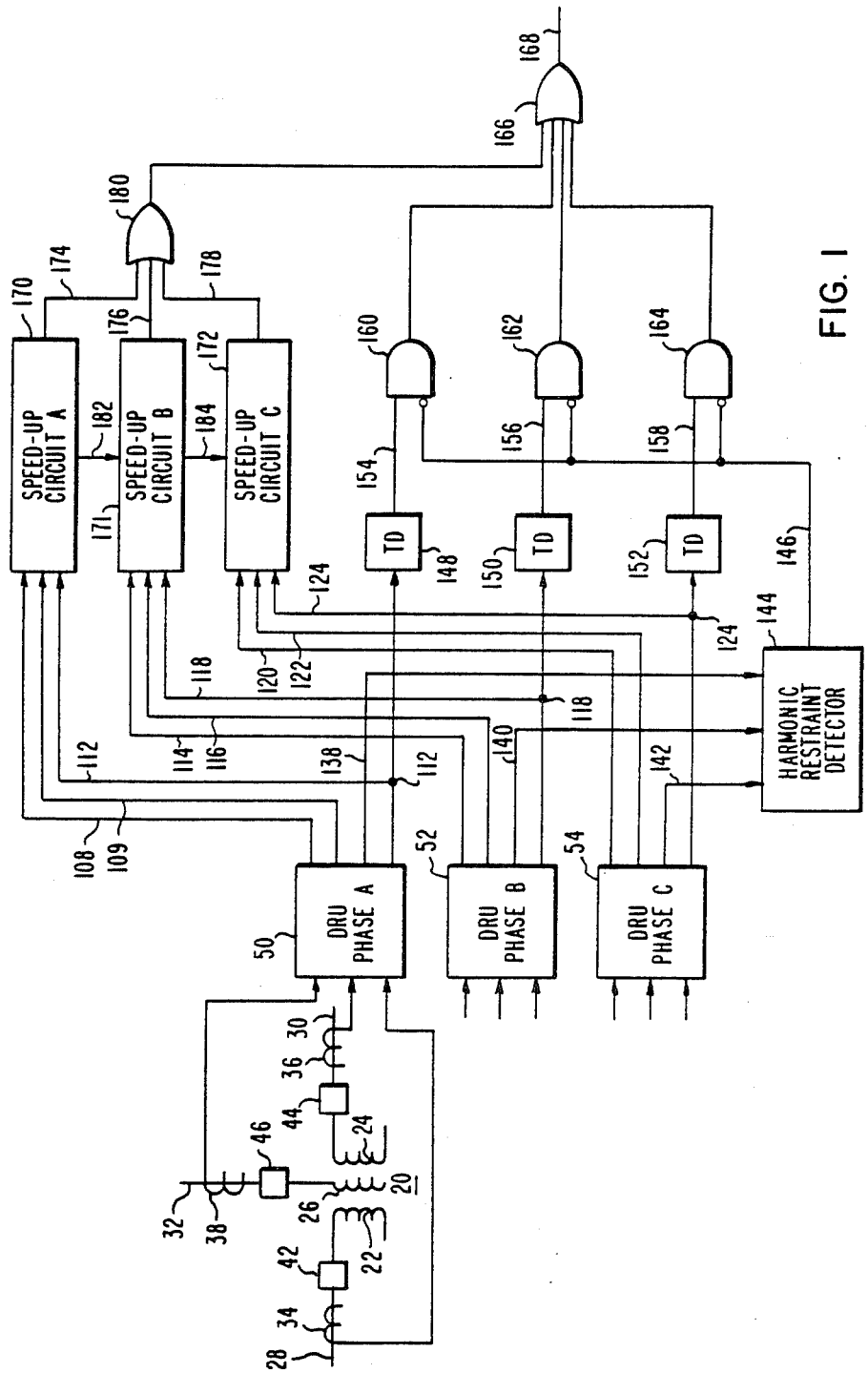
FIG. 1 is a block diagram schematic illustration of a transformer differential relay suitable for embodying the principles of the present invention.

Referring to FIG. 1, a power transformer 20 having a plurality of windings 22, 24 and 26 is coupled correspondingly to line sections 28, 30 and 32 of a power system network for power coupling purposes. The schematic illustration of FIG. 1 shows only one phase A of the power system network, but is understood that the network generally includes three phases, e.g. A, B and C. Accordingly, there is an additional set of line sections and transformer windings for the other phases B and C of the transformer 20 which are not shown in FIG. 1. Current transformers 34, 36 and 38 coupled respectively to the line sections 28, 30 and 32 measure the current through the transformer windings 22, 24 and 26, respectively. The current transformers 34, 36 and 38 establish a differential zone about the transformer 20. Also disposed within the differential zone are conventional breaker units 42, 44 and 46 to interrupt current through th paths 28, 30 and 32 of the transformer 20 and isolate the transformer 20 from the power system network. A similar current transformer and breaker unit arrangement is also found for the transformer windings of phases B and C.

In the present embodiment, a conventional differential relay unit (DRU) 50 monitors the current signals generated by the current transformers 34, 36 and 38 and from this information, determines if a potential internal fault exists within the power transformer 20 for phase A. Two other DRU's 52 and 54 monitor the current signals from the windings of phases B and C, the other two phases of the transformer 20. In general, the conventional differential relay units 50, 52 and 54 monitor the current signals generated by their respective current transformers and from this information determine if a potential internal fault exists within the power transformer 20 in any of the power system phases thereof. Each DRU 50, 52 and 54 is operative to generate restraint signals correspondingly from the generated current signals and for selecting the restraint signal having the greatest amplitude, more commonly referred to as the highest restraint signal. The details of the internal operation of a typical DRU will be described more specifically in connection with the embodiment depicted in FIG. 2.

Figure 2:
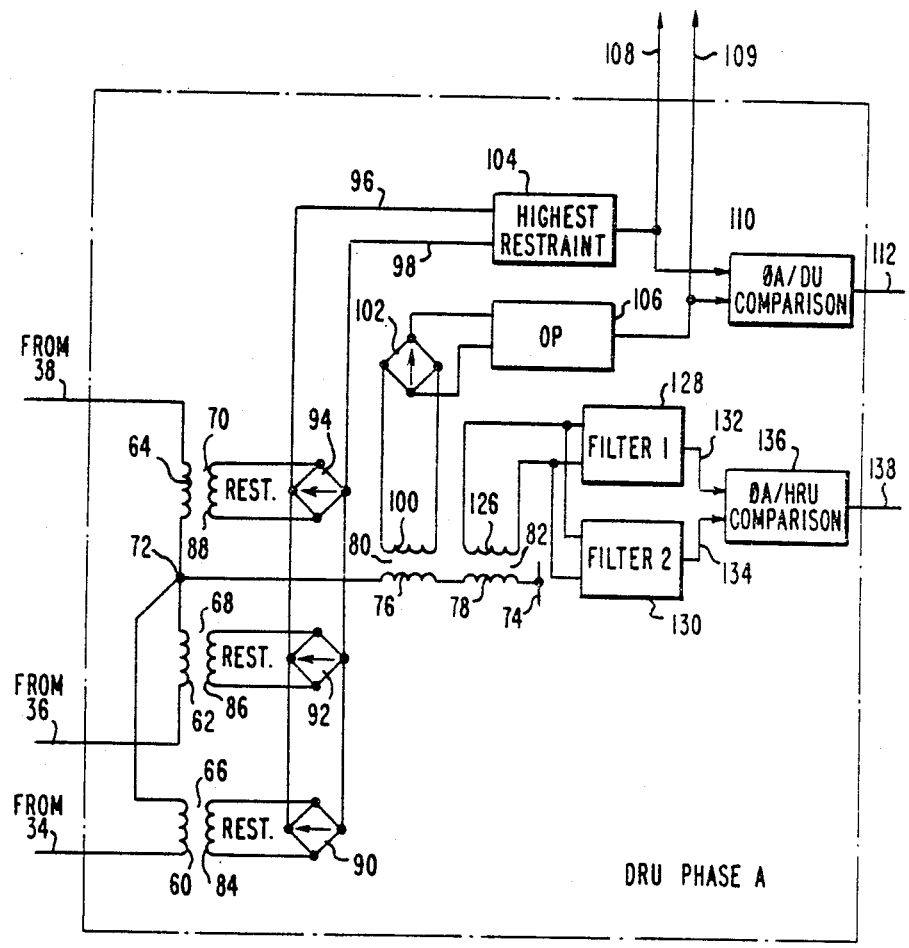
FIG. 2 is a block diagram achematic of a differential relay unit for one phase of the transformer suitable for use in the embodiment of FIG. 1.

Referring to FIG. 2. the current signals associated with the current transformers 34, 36 and 38 are each coupled to one winding 60, 62 and 64 of a set of corresponding signal transformers 66, 68 and 70, respectively. The windings 60, 62 and 64 are star coupled to a common point 72 which is coupled to a common potential 74 through the windings 76 and 78 of auxiliary signal transformers 80 and 82, respectively. The current signals of 34, 36 and 38 effect a first potential representative of the corresponding restraint signal across the windings 60, 62 and 64. These first potentials induce electromagnetically a second potential across the other windings 84, 86 and 88 of the transformers 66, 68 and 70 are respectively proportional to their corresponding first potentials of 60, 62 and 64.

Diode bridge networks 90, 92 and 94 are coupled to the windings 84, 86 and 88, respectively, to effect a full-wave rectified second potential signal across the output terminals thereof in each case. Accordingly, the rectified signals developed across the bridges 90, 92 and 94 are always proportional to the corresponding derived restraint signals from the currents measured by the current transformers 34, 36 and 38, respectively. Circuit paths 96 and 98 couple like terminal outputs of the diode bridges 90, 92 and 94 in parallel wherein the potential across the circuit paths 96 and 98 is representative of the highest restraint signal developed by the signal transformers 66, 68 and 70.

The current developed through the winding 76 of the signal transformer 80 induces a potential representative of an operating signal measurement of the differential relay unit across another winding 100 thereof. Another diode bridge network 102 is coupled to the winding 100 to full-wave rectify the operating signal developed across the winding 100. The highest restraint signal of signal lines 96 and 98 and the operating potential developed from the diode bridge network 102 may be provided to conventional conditioning circuits 104 and 106, respectively. Conditioned highest restraint and operating signals are conducted over signal lines 108 and 109, respectively, to a conventional comparison unit 110 which determines whether or not a potential internal fault condition exists within the differential transformers 34, 36 and 38. The comparison unit 110 generates a signal 112 in one state to indicate an internal fault condition and in a second state to indicate no internal fault condition. The conditioned highest restraint and operating signals are also provided external to the DRU 50 over signal lines 108 and 109. Similarly, the DRU 52 for phase B generates highest restraint, operating, and internal fault indication signals over signal lines 114, 116 and 118, respectively. In the same manner, the DRU 54 for phase C also generates highest restraint, operating, and internal fault indication signals over signal lines 120, 122 and 124 (refer to FIG. 1).

Referring to FIG. 2, the current developed through the winding 78 of the auxiliary signal transformer 82 may be coupled electromagnetically to another winding 126 which may be coupled to two conventional filter networks 128 and 130 arranged in parallel. For the present embodiment, the filter network 128 may be a bandpass filter passing a signal 132 which is representative substantially of the second harmonic signal content of the operating signal induced across the winding 126. Conversely, the filter network 130 may be a band reject filter for rejecting substantially the second harmonic signal content of the same operating signal to pass a signal 134 representative of the signal content of the remaining frequency spectrum of the operating signal. The signals 132 and 134 are delayed by at least one powerline cycle from the operating signal 126 due to the filter processing time of the filters 128 and 130. The signals 132 and 134 may be compared in another conventional comparison unit 136, normally referred to as a harmonic restraint comparator, which determines whether or not an inrush excitation condition exists in the transformer 20. The comparator 136 generates a signal 138 to a first state if the inrush condition is determined to exist and in a second state if no such condition exists. In a similar manner, the other DRU's units 52 and 54 likewise generates inrush condition signalling 140 and 142, respectively, (refer to FIG. 1).

Moreover, for the three-phase embodiment depicted in the block schematic diagram of FIG. 1, a harmonic restraint detector 144 is included for detecting if any one of the signals 138. 140 and 142 indicate an inrush condition. Accordingly, the detector 144 generates its output signal 146 in a first state indicative of such condition and in a second state indicative of a non-inrush condition. The three internal fault indication signals 112, 118 and 124 generated by the DRUs 50, 52 and 54, respectively, are delayed for a delay time interval by the units 148, 150 and 152, respectively. The delay time interval corresponds to the processing time interval of the filters, like 128 and 134, for example, of the DRUs 50, 52 and 54, which are used for the current inrush detection therein. Delayed internal fault signals 154, 156 and 158 from the DRUs 50, 52 and 54, respectively, are provided to one input of a set of AND gates 160, 162 and 164, respectively. The harmonic restraint signal 146 is provided commonly to an inverting input of each of the AND gates 160, 162 and 164. The outputs of the AND gates 160, 162 and 164 are provided to three inputs of an OR gate 166 which is operative to generate a signal 168 for operating breaker units, like 42, 44 and 46, for example.

In a typical operation, the current transformers 34, 36 and 38 monitor the current through the phase A windings 22, 24 and 26 of the power transformer 20 and provide their respective signals to the DRU 50. In DRU 50, the current signals are received by their respective signal transformers 66, 68 and 70 which derive the restraint signals thereof. Utilizing the diode bridges 90, 92 and 94, the highest of the restraint signals is provided over the signal lines 96 and 98 to the conditioning circuit 104 which in turn generates a conditioned highest restraint signal over signal line 108. An operating signal is also derived from the received current signals by the vector addition thereof which is coupled through the transformer 80 and full-wave rectified by the diode bridge 102. The resulting operating signal is conditioned in the circuit 106 and a conditioned operating signal is provided over a signal line 109. The comparison circuit 110 uses the highest restraint signal and operating signal from the signal lines 108 and 109, respectively, to distinguish between an internal and an external fault of the power transformer 20. One state of the signal line 112 generated by the comparison unit 110 is indicative of a potential internal fault.

Moreover, the vector addition of the received current signals is further provided through the auxiliary signal transformer 82 to the harmonic restraint circuitry comprising the units 128, 130 and 136 for detecting a current inrush condition of the power transformer 20. As indicated hereabove, the detection process takes at least one power line cycle rendering the signal 138 delayed by at least one power line cycle.

Referring to FIG. 1, if any of the harmonic restraint signals 138, 140 or 142 is generated, the detector unit 144 responds by generating a common restraint signal 146 which is delayed by at least one power line cycle. The DRU of the phase incurring the current inrush condition responds by generating a false internal fault indication signal over the corresponding signal line 112, 118 or 124 to the respective AND gate 160, 162 or 164. However, the internal fault indication signal may be generated within three to five milliseconds upon the inducement of the instant current inrush condition. If no compensation is provided for the difference in response times between the internal fault detection and current inrush detection, the internal fault indication signal will pass through its respective AND gate and cause an unwanted breaker operation via OR gate 166 and signal 168 before the harmonic restraint signal 146 can inhibit its passage through the respective AND gate.

To prevent this occurrence, the present embodiment includes time delay units 148, 150 and 152 in the internal fault indication signal paths of the DRUs 50, 52 and 54, respectively, to delay the internal fault indication signal slightly longer than the delay of the current inrush detection process insuring that the restraint signal 146 will reach the AND gates 160, 162 and 164 before the internal fault indication signal to inhibit the passage thereof if an inrush condition is found to exist. The drawback here is, of course, that if no inrush condition exists and an actual internal fault has occurred, then the breaker operation is delayed by the corresponding time delay of the units 148, 150 and 152 which happen to be at least 10 milliseconds or greater.

In accordance with the present invention, speed-up circuits 170, 171 and 172 are disposed in the differential relay and coupled to the DRUs 50, 52 and 54, respectively. Each speed-up circuit corresponds to a phase A, B and C and each is governed by the highest restraint, operating and internal fault condition signals generated by its corresponding DRU. Each speed-up circuit is operative to detect a transformer internal fault condition associated with its corresponding phase and to generate in response to the detection, without substantial delay and independent of the other internal fault and harmonic restraint circuitry of the differential relay, a substantially undelayed signal for operating the breaker units.

In the present embodiment, the undelayed signals generated by the units 170, 171 and 172 are conducted over the paths 174, 176 and 178, respectively, to the inputs of an OR gate 180, the output of which being coupled to a fourth input of the OR gate 166. Thus, if any one of the undelayed signals 174, 176 or 178 is generated the OR gate 180 responds to govern the operation of the breaker units via OR gate 166 and signal line 168. Thus, the speed-up circuits 170, 171 and 172 are included in the differential relay to circumvent the delay time interval corresponding to the current inrush detection process and speed-up the generation of a signal for operating the breaker units under transformer internal fault conditions. The response time of the speed-up circuits may render breaker operation of approximately three to five milliseconds from the occurrence of an internal fault in at least one phase of the power transformer 20. Some dependence between the speed-up circuits 170, 171 and 172 may be provided over the signal paths 182 and 184 as will become more apparent from the following description.

Figure 3:
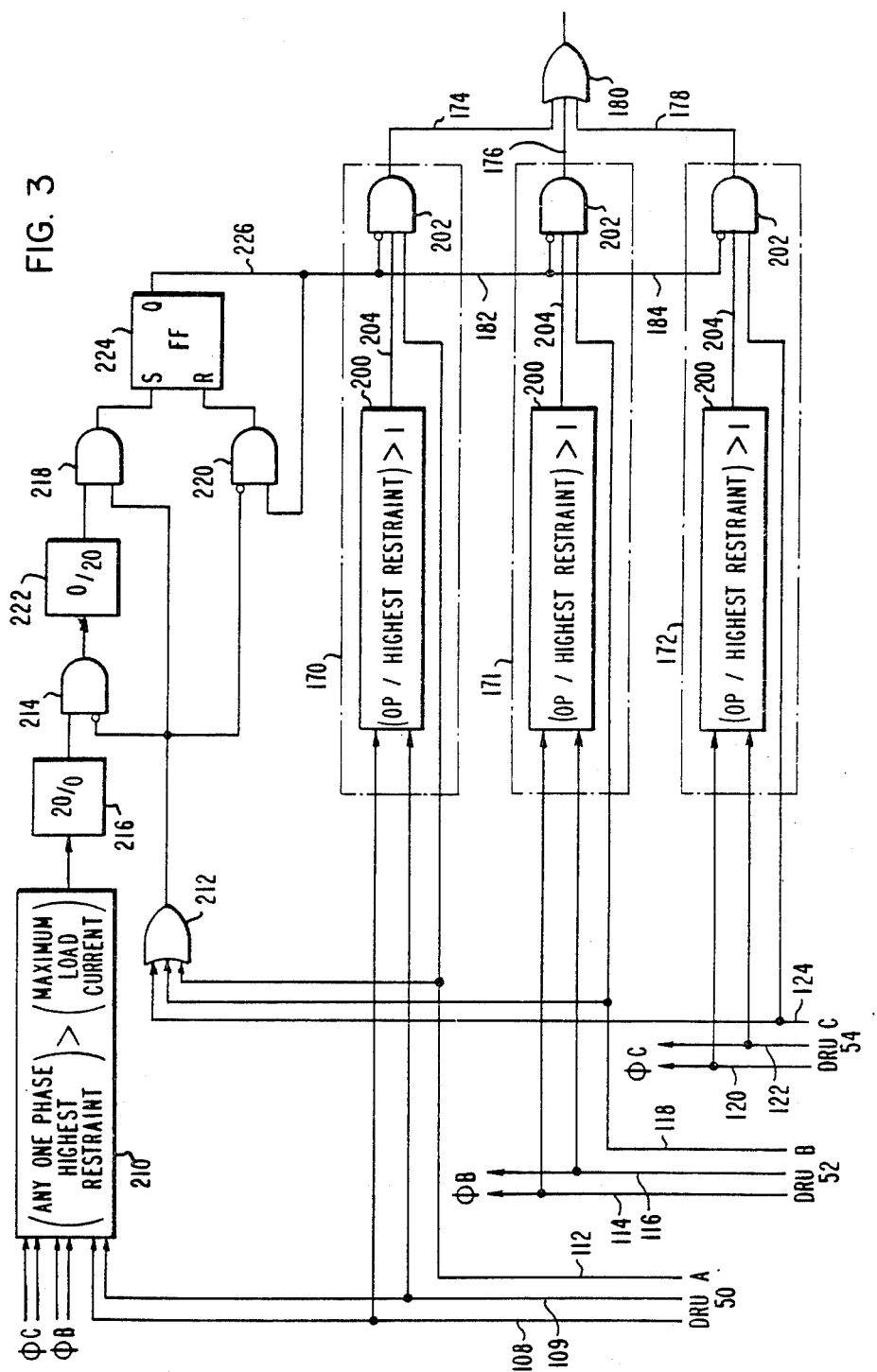
FIG. 3 is a block diagram schematic of a plurality of speed-up circuits suitable for use in the embodiment of FIG. 1.

A suitable embodiment for the speed-up circuits 170, 171 and 172 is depicted in the block diagram schematic of FIG. 3. Typically, each of the units 170, 171 and 172 include a unit 200 and an AND gate 202. The unit 200 is operative to take the ratio of its corresponding operating signal to its corresponding highest restraint signal and compare this ratio to unity. An output signal of the unit 200 is provided to one input of the AND gate 202 and the corresponding internal fault indication signal is coupled to another input of the same AND gate 202. The signal 204 is conducted to one state if the ratio is greater than unity and to another state otherwise. In the event that the ratio is greater than unity and the internal fault indication signal is present, the AND gate 202 generates the undelayed signal 174, 176 or 178 which causes undelayed breaker operation.

Now, for the case of initial inrush, the ratio of the corresponding operating and highest restraint signals is determined to be equal or less than, but not greater than unity in which case the AND gate is disabled from passing the undelayed internal fault indication signal. For an external fault without current transformer saturation, the operating signal is substantially zero rendering the ratio less than unity and disabling the AND gate 202. In the case of an external fault with severe current transformer saturation, the ratio may become greater than unity. However, the DRU corresponding to the phase or phases of the external fault will detect such a condition and generate the appropriate signal over its fault indication signal line disabling the AND gate 202. The only condition which remains is the recovery current inrush condition which will be handled by the remaining functional units in the embodiment depicted in FIG. 3.

Referring to FIG. 3, at least the three highest restraint signals 108, 114 and 120 are provided to the functional block 210 of the recovery inrush detection arrangement. In addition, the three internal fault indication signals 112, 118 and 124 are provided to an OR gate 212. The output of the OR gate 212 is coupled to an inverting input of an AND gate 214. The output of the functional block 210 is coupled to another input of the AND gate 214 through a first timer unit 216. The output of the OR gate 212 is also coupled to one input of an AND gate 218 and to an inverting input of another AND gate 220. The output of the AND gate 214 is coupled to the other input of the AND gate 218 through a second timer unit 222. The outputs of the AND gates 218 and 220 are coupled to the set and reset inputs, respectively, of a bistable circuit 224. The output of the circuit 224 is provided to the other input of the AND gate 220 and also commonly to the inverting inputs of the AND gates 202 in the circuits 170, 171 and 172 via signal lines 182 and 184.

The above-described recovery inrush detection circuitry may be embodied for convenience in any of the speed-up circuits 170, 171 and 172 with its output being provided to the other two over the signal lines 182 and 184 as shown in the diagram of FIG. 3. In operation, the functional block 210 detects a transformer external or through fault current condition by selecting the highest restraint signal with the greatest magnitude from the signal lines 108, 114 and 120 and compares this selected signal to a prespecified magnitude value which may be set at the maximum load current of a phase of the power transformer 20, for example. Should the selected highest restraint signal be greater than the prespecified value, a signal is generated to the timer 216 indicating a through fault current condition.

The timer 216 is operative to delay the passage of the generated signal to the AND gate 214 by a predetermined delay time which, for the present embodiment, is set at 20 milliseconds, however, the timer 216 is set to respond immediately to a loss of the generated signal from 210. The OR gate 212 monitors the signal lines 112, 118 and 124 for an internal fault indication. With no internal fault indication, the OR gate 212 enables the AND gate 214 to pass the generated signal from 210 to the timer 222 which is set in the present embodiment to respond without delay to enable the AND gate 218. Should the OR gate 212 detect an internal fault indication over any one of the signal lines 112, 118 or 124 indicative of a recovery inrush condition, the AND gates 214 and 220 are disabled. In addition, the enabling signal generated by the timer 222 is sustained for a predetermined time interval which may be on the order of 20 milliseconds, for example, permitting the internal fault indication signal passing through the OR gate 212 to set the bistable 224 via the AND gate 218 and cause the generation of the recovery inrush restraint signal 226. The signal 226 disables the AND gates 202 in the circuits 170, 171 and 172 and inhibits breaker operation governed thereby. When the recovery inrush condition is relieved, the OR gate 212 responds by disabling AND gate 218 and enabling AND gates 214 and 220. With AND gate 220 enabled, the signal 226 may be fed back and cause the bistable 224 to be reset which terminates the generation of the disabling signal 226 and relieves the operational restraint on the speed-up circuits 170, 171 and 172.

In summary, the speed-up circuits 170, 171 and 172 are operative to circumvent the time delay in breaker operation of a transformer differential relay and render breaker initiation for detected internal faults with response times on the order of three-five milliseconds. In addition, the speed-up circuits are inhibited from responding to potential internal fault conditions which may arise from initial inrush or recovery inrush currents in the power transformer 20. Still further, the speed-up circuits also inhibit breaker operation under external fault conditions even with severe current transformer saturation.

I claim:

1. A differential relay for protecting a transformer disposed in a power system against internal faults, said transformer having a plurality of windings, each winding having associated therewith a current measuring device which produces a winding current signal representative of the current through said winding, said power system including a breaker operative to interrupt current through said transformer, said differential relay comprising:

receiving means for connection with said current measuring devices for receiving said winding current signals from said current measuring devices restraint signal deriving means interconnected with said receiving means for deriving a highest restraint signal from said winding current signals;

operating signal deriving means interconnected with said receiving means for deriving an operating signal from said winding current signals;

fault detecting means interconnected with said restraint signal deriving means and said operating signal deriving means for receiving said operating and highest restraint signals for detecting an internal fault condition in said transformer and for generating a fault signal representative of said latter detection;

current inrush means interconnected with said operating signal deriving means for detecting a current inrush condition after a predetermined time interval in said transformer and for generating a current inrush signal representative of said latter detection, delay means interconnected with said fault detecting means for delaying said fault signal by a delay time corresponding to said time interval;

generating means interconnected with said delay means for generating a trigger signal for operating said breaker, said generating means when actuated by said delayed fault signal nevertheless being inhibited by the presence of said current inrush signal; and quick response means interconnected with said restraint signal deriving means, said operating signal deriving means and said fault detecting means for detecting a transformer internal fault condition and for generating in response to said latter detection, without substantial delay and independent of said generating means, a quick response signal for tripping said breaker, whereby said quick response means is operative to circumvent said delay time.

2. The differential relay in accordance with claim 1 wherein said quick response means includes ratio means governed by the ratio of said operating signal to said highest restraint signal and said fault signal to generate said quick response signal.

3. The differential relay in accordance with claim 2 wherein said quick response means includes:

comparison means for determining substantially instantaneously when the ratio of said operating signal to said highest restraint signal is greater than unity and for generating a comparison signal indicative thereof; and logic means governed by said fault signal and said comparison signal to generate said quick response signal.

4. The differential relay in accordance with claim 1 wherein said quick response means includes recovery current inrush means governed by said highest restraint signal and said fault signal for detecting a recovery inrush current and for generating a recovery current inrush signal indicative of said latter detection; and a disabling means governed by said recovery current inrush signal for inhibiting the generation of said quick response signal.

5. The differential relay in accordance with claim 4 wherein said recovery current inrush means includes:

through fault detecting means governed by said highest restraint signal for detecting a through fault current in said transformer and for generating, solely in the absence of said fault signal, a through fault signal indicative of said latter detection, said through fault detecting means being operative to sustain said through fault signal for a sustaining time interval upon the generation of said fault signal; and a bistable circuit means responsive to the presence of said fault signal during said sustaining time interval for generating said recovery current inrush signal and responsive to the absence of said fault signal for terminating said recovery current inrush signal.

6. The differential relay in accordance with claim 5 wherein said through fault detecting means includes:

intermediate signal means for generating a first intermediate signal when said highest restraint signal is above a prespecified magnitude;

logic means responsive solely to the presence of said first intermediate signal and the absence of said fault signal for generating a second intermediate signal; and timer means response to said second intermediate signal for generating said through fault signal and operative to sustain said through fault signal for said sustaining time interval upon the termination of said second intermediate signal 7. A differential relay for protecting a transformer disposed in a power system against internal faults, said transformer having a plurality of windings, each winding having associated therewith a current measuring device which produces a signal representative of the current through said winding, said power system including a breaker operative to interrupt current through said transformer, said differential relay comprising;

receiving means for connection with said current measuring devices for receiving said winding current signals from said current measuring devices;

restraint signal deriving means interconnected with said receiving means for deriving a highest restraint signal from said winding current signals;

operating signal deriving means interconnected with said receiving means for deriving a highest restraint signal from said winding current signals;

operating signal deriving means interconnected with said receiving means for deriving an operating signal from said winding current signals;

fault detecting means interconneced with said restraint signal deriving means for receiving said operating and highest restraing signals for detecting an internal fault condition in said transformer and for generating a fault signal representative of said latter detection;

current inrush means interconnected with operating signal deriving means for detecting a current inrush condition in said transformer and for generating after a predetermined time interval a current inrush signal representative of said latter detection;

delay means interconnected with said fault detecting means for delaying said fault signal by a delay time corresponding to said time interval;

generating means interconnected with said delay means for generating a trigger signal for operating said breaker, said trigger signal when produced by said delayed fault signal being inhibited by the presence of said current inrush signal;

ratio means governed by the ratio of said operating signal to said highest restraint signal and said fault signal for detecting a transformer internal fault condition and for generating, without substantial delay and independent of said generating signal, a quick response signal for tripping said breaker, whereby said quick response signal is operative to be produced regardless of said delay time; and recovery inrush current means governed by said highest restraint signal and said fault signal for detecting a recovery inrush current and for generating a recovery current inrush signal indicative of said latter detection and for inhibiting the generation of said quick response signal.

8. A differential relay for protecting a multiphase transformer disposed in a power system against internal faults, said transformer having a plurality of windings, each winding having associated therewith a current measuring device which produces a winding current signal representative of the current through said winding, said power system including a breaker operative to interrupt current through said transformer, said differential relay comprising:

a differential relay unit for connection with said current measuring device for each phase of said multiphase transformer, each said differential relay unit comprising:

receiving means for receiving said winding current signals from said current measuring devices;

restraint signal deriving means interconnected with said receiving means for deriving a highest restraint signal from said winding current signals;

operating signal deriving means interconnected with said receiving means for deriving an operating signal from said winding current signals;

fault detecting means interconnected with said restraint signal deriving means for receiving said operating and highest restraint signals for detecting an internal fault condition in said transformer and for generating fault signal representative of said latter detection;

current inrush means interconnected with said operating signal deriving means for detecting a current inrush condition in said transformer and for generating after a predetermined time period a current inrush signal representative of said latter detection;

delay means interconnected with said fault detecting means for delaying said fault signal by a delay time corresponding to said time interval;

logic means governed by said delayed fault signals of each phase of said multiphase transformer to generate a signal for operating said breaker, said trigger signal being inhibited by the presence of any one of said current inrush signals; and speed-up circuit means governed by said highest restraint signal, said operating signal and said fault signal of a corresponding differential relay unit for detecting an internal fault condition in the corresponding winding of said transformer and for generating in response to said latter detection, without substantial delay and independent of said trigger signal a quick response signal for operating said breaker, whereby each speed-up circuit operates to circumvent said delay time.

9. The differential relay in accordance with claim 8 including:

recovery current inrush means governed by said highest restraint signals and said fault signals of said differential relay units for detecting a recovery inrush current and for generating a recovery current inrush signal indicative of said latter detection; and disabling means governed by said recovery current inrush signal for inhibiting the generation of all of said quick response signals by said speed-up circuits.

10. The differential relay in accordance with claim 9 wherein said recovery current inrush means includes:

through fault detecting means governed by the highest restraint signals for detecting a through fault current condition in said transformer and for generating, solely in the absence of said fault signals, a through fault signal indicative of said latter detection, said through fault detecting means operative to sustain said through fault signal for a sustaining time interval upon the generation of any one of said fault signals; and a bistable circuit responsive to the generation of any one of said fault signals during the sustaining time interval of the through fault signal to generate said recovery current inrush signal and responsive to the loss of all of said fault signals to terminate said recovery current inrush signal.

11. The differential relay in accordance with claim 10 wherein said through fault detecting means includes:

intermediate signal means for generating a first intermediate signal when the largest magnitude of the highest restraint signals is above a prespecified magnitude;

logic means responsive solely to the presence of said first intermediate signal and the absence of all of said fault signals to generate a second intermediate signal; and timer means responsive to said second intermediate signal for generating said through fault signal and operative to sustain said through fault signal for said sustaining time interval upon termination of said second intermediate signal.

* * * * *